Feb. 6, 1968 E. P. AGHNIDES 3,367,381
TUBELESS TIRE WITH SUPPLEMENTAL SUPPORT
Filed Feb. 6, 1964 4 Sheets-Sheet 1

INVENTOR
Elie P. Aghnides

BY Moore, Hall & Pollock
ATTORNEYS

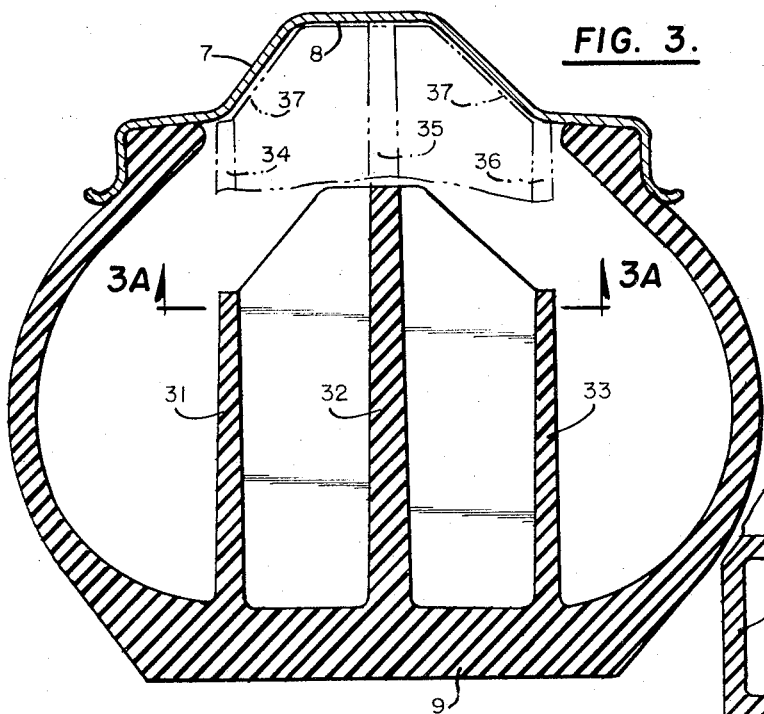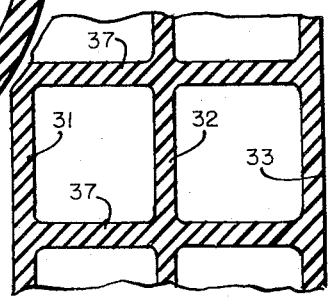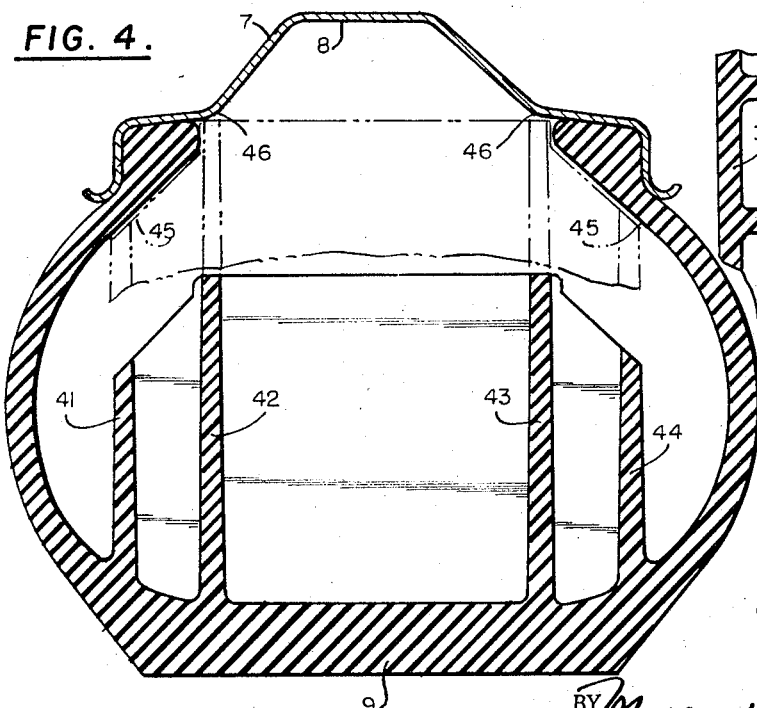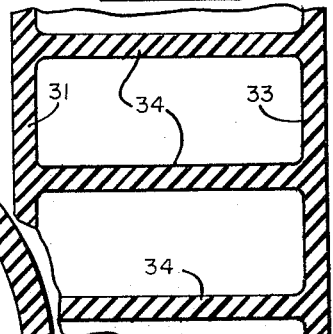

Feb. 6, 1968    E. P. AGHNIDES    3,367,381
TUBELESS TIRE WITH SUPPLEMENTAL SUPPORT
Filed Feb. 6, 1964    4 Sheets-Sheet 4
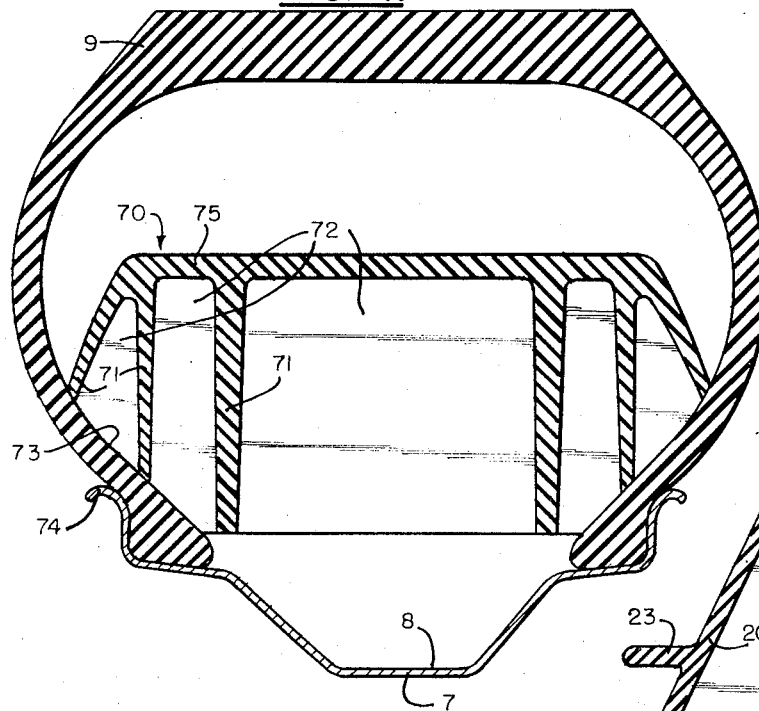
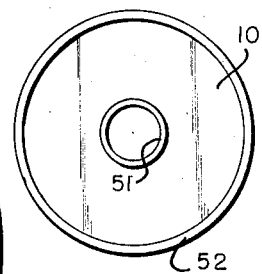
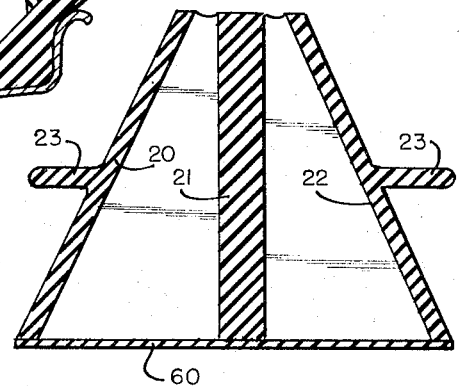
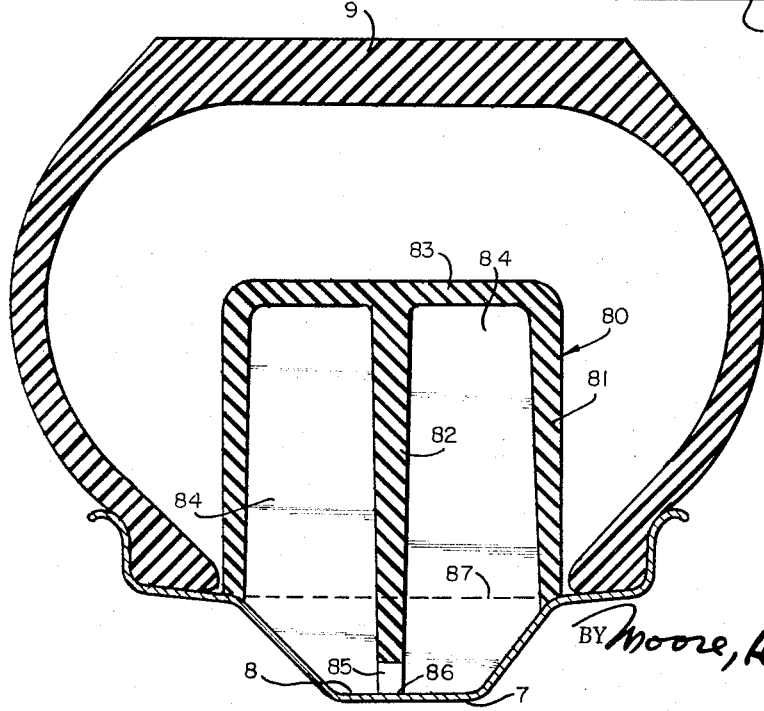
INVENTOR
Elie P. Aghnides
BY Moore, Hall & Pollock
ATTORNEYS

United States Patent Office 3,367,381
Patented Feb. 6, 1968

3,367,381
TUBELESS TIRE WITH SUPPLEMENTAL SUPPORT
Elie P. Aghnides, 46 W. 54th St.,
New York, N.Y. 10019
Filed Feb. 6, 1964, Ser. No. 342,884
5 Claims. (Cl. 152—158)

This invention relates to pneumatic tubeless tires of the type used on automobiles and other vehicles.

Blowouts at high car speeds have always been dangerous and while the invention of the tubeless tire reduced the danger it did not eliminate the danger. Moreover, it is not desirable to drive short distances on tubeless tires that have become flat. It is the primary object of my invention to overcome these inadequacies of the prior art tubeless tires.

Another object of the invention is to provide a tubeless tire with more strength than those of the prior art.

Yet another object of the invention is to provide a supplemental rolling support, for a tubeless tire, which is effective in event the tubeless tire loses its air.

Still another object of the invention is to reduce the likelihood of punctures in tubeless tires.

An additional object of the invention is the provision of puncture-proof means that a car can run on for a limited distance if the pneumatic tubeless tire loses its air.

A further object of the invention is to provide a supplementary rolling element, for tubeless tires, that is simple in construction yet reliable in operation.

Still further, it is an object of the invention to provide a supplementary rolling element for tubeless tires that can be sold separately from the tire and easily inserted for use by those drivers who ask for it.

Furthermore, it is an object of the invention to provide a suplementary rolling element for tubeless tires that is low in cost.

Other objects and advantages of the invention will appear as this description proceeds.

The invention in its broader aspects relates to a supplemental ring-shaped elastic element whose outer periphery is adjacent or in engagement with the inner wall of the pneumatic tubeless tire, or whose inner wall is adjacent to the inner wall of the tire or the rim of the wheel, so that if the tire loses its air the ring will provide support for the wheel. The ring-shaped elastic element is preferably strong enough to hold the rim of the wheel well above the road in the case of a blowout at high speeds; but in any case is strong enough to enable the car to be driven to a safe place off the road or to a repair station.

Other features of the invention relate to the construction for the ring-shaped elastic element.

In the drawings:

FIGURE 3 is a cross-sectional view of yet another modified form of the invention.

FIGURE 3A is a cross-sectional view of FIGURE 3 taken along line 3A—3A.

FIGURE 3B is a cross-sectional view of a modified form of the support of FIGURE 3, taken along line 3A—3A of FIGURE 3.

FIGURE 4 is a cross-sectional view of an additional modified form of the invention.

FIGURE 5 is a cross-sectional view of a modified form of insert for a tubeless tire adapted to fit tires of different sizes.

FIGURE 6 is a cross-sectional view of a further modified form of insert with a sealing membrane therein.

FIGURE 7 is a cross-sectional view of a further modified form of the invention.

FIGURE 8 is a cross-sectional view of another modified form of the invention.

In FIGURES 1, 2, 3 and 4, the invention is shown in conjunction with a standard automobile wheel having a conventional rim 7 the periphery 8 of which is concave in the usual way. The pneumatic tubeless tire 9 is conventional so far as its normal association with the rim 7 is concerned and is also conventional so far as its external configuration is concerned. The relatively flat ground-contacting or lower surface of the tire 9 has treads as usual. In short, everything about the wheel, rim and tire may be conventional, except for the internal supplemental support soon to be described. In connection with each of FIGURES 1, 2, 3 and 4, the rim 7 and tire 9 are non-symmetrical as shown and as is customary.

Figure 1:
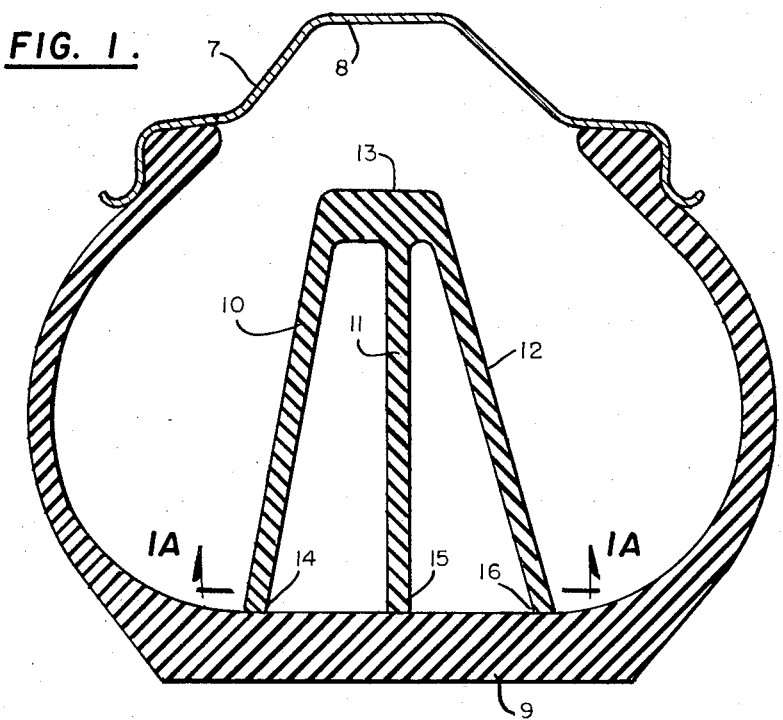
FIGURE 1 is a cross-sectional view of a tire embodying one form of the invention.

In FIGURE 1, the supplemental support 10, 11 and 12 is honeycomb structure closed at its smaller-diameter portion 13. The ends 14, 15 and 16 of legs 10, 11 and 12, may be vulcanized, cemented or otherwise secured to the inside wall of the tire 9, preferably on the portion of the inside wall opposite the tread as shown. However, cementing, etc., is not necessary for if the support 10, 11 and 12 is strong enough, it will remain in position without any adhesive of any kind.

Figure 1A:
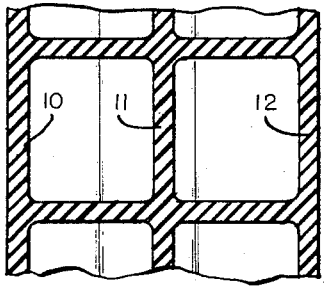
FIGURE 1A is a cross-sectional view of FIGURE 1 taken along lines 1A—1A.

The honeycomb structure of FIGURE 1A shows one form that the support 10, 11, 12 of FIGURE 1 may take.

Figure 1B:
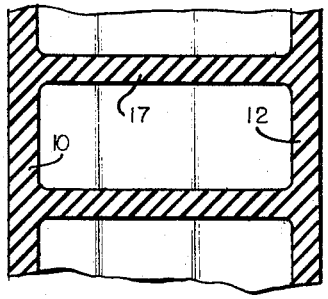
FIGURE 1B is a cross-sectional view of a modified form that the support 10, 11, 12 of FIGURE 1 may take, this view also being taken along line 1A—1A of FIGURE 1.

Instead of the honeycomb of FIGURE 1A, the arrangement of FIGURE 1B may be used. This figure shows a cross-section along line 1A—1A of FIGURE 1 in which cross-bracing elastic elements 17 replace support 11.

Figure 1C:
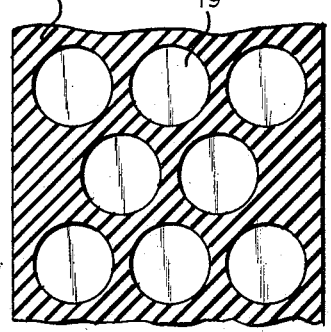
FIGURE 1C is a cross-sctional view of a further modified form that the support 10, 11, 12 of FIGURE 1 may take, this view also being taken along line 1A—1A of FIGURE 1.
Figure 1D:
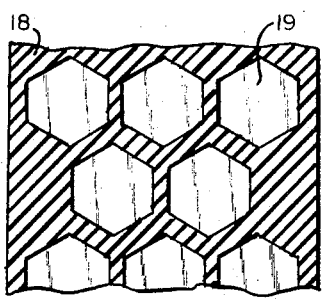
FIGURE 1D is a cross-sectional view of a still further modified form that the support 10, 11, 12 of FIGURE 1 may take, this view also being taken along line 1A—1A of FIGURE 1.

FIGURES 1C and 1D are further modified forms in which the ribs or webs 10, 11 and 12 are replaced by an elastic member 18 which is solid except for perforations 19.

In each of FIGURES 1, 1A, 1B, 1C and 1D, the supplemental support is ring-shaped in the sense that there is a periphery (which contacts the inner wall of tire 9), and an inside surface 13. The aforesaid ring-shaped element tapers to a narrower width as its diameter decreases, as shown.

Figure 2:
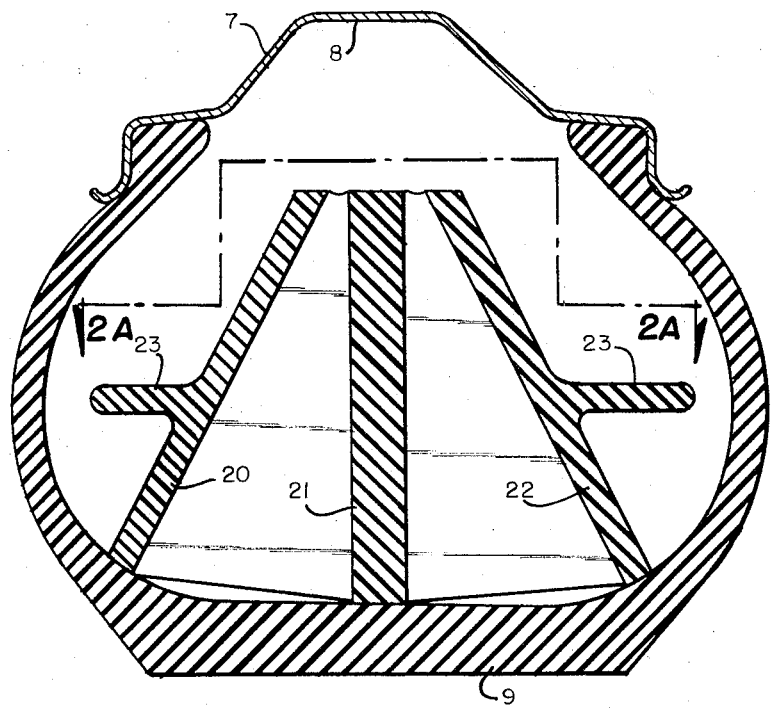
FIGURE 2 is a modified form of the invention.
Figure 2A:
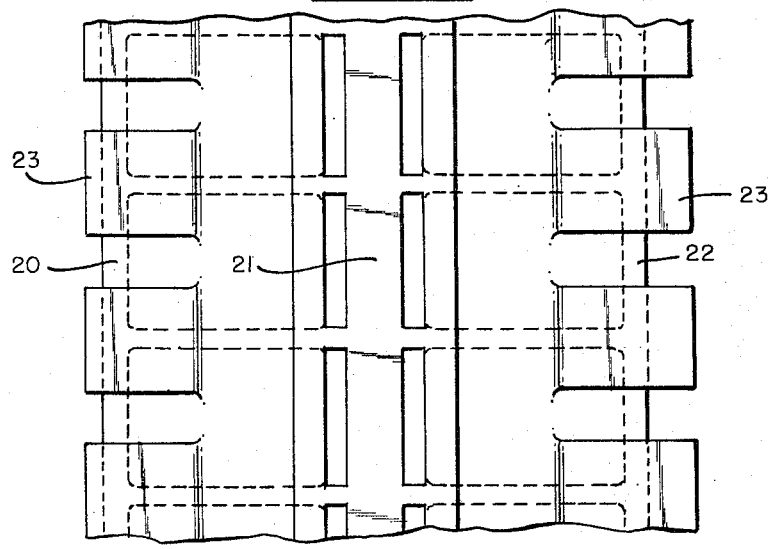
FIGURE 2A is a cross-sectional view taken along line 2A—2A of FIGURE 2.

In FIGURE 2, the ring-shaped element 20, 21 and 22 is generally similar to that shown in FIGURES 1 and 1A and include a honeycomb arrangement shown in FIGURE 2A. One distinction of FIGURE 2 over FIGURE 1 is the addition of centering arms or flanges 23 which engage the inner side wall of the tire 9 as necessary to retain the support 20, 21, 22 centered within the tire 9. The arms or flanges 23 are especially helpful when the support 20, 21, 22 is sold separately from the tire and installed without use of cement or adhesive.

In FIGURE 3 the supports 31, 32 and 33 serve the same purpose as 10, 11, 12 of FIGURE 1, the main difference being that in FIGURE 3 the tire 9 and the supports 31, 32 and 33 are all in one piece. While FIGURE 3 may employ the honeycomb arrangement as shown in FIGURE 3A, this differs from that of FIGURE 1 in that the structure is open at the end of smaller diameter (that is, the inner surface of the ring 31, 33, 32; or, stated in still another way, at the top end of 31, 32, 33 as shown in the drawing). Instead of the center support 32, cross-braces 34 may be used as shown in FIGURE 3B; or a truly honey-comb as shown in FIGURE 1D may be used.

The dot-dash lines 34, 35, 36 of FIGURE 3 show the position of supports 31, 32, 33 in event the tire loses its air.

In FIGURE 4, the supports 41, 42, 43 and 44 are similar to those of FIGURE 1 except they are positioned to engage the outer parts 46 of the rim 7 and the upper inner side wall 45 of the tire instead of near the middle of the rim. Otherwise the construction and mode of operation is the same as in FIGURE 1. It is noted that in FIGURES 1, 2 and 3 the insert is contoured to engage some particular part of the concave rim surface. For example, in FIGURE 1 the face 13 will engage the relatively flat portion of the inner face 8 of the rim 7. FIGURE 2 is the same in this respect. In FIGURES 3, 3A and 3B, the cross-braces 34 and 37 are contoured to fit the entire face of the rim other than that normally covered by the tire.

The special supplemental support 10-11-12 of FIGURE 1, 20-21-22 of FIGURE 2, 31-32-33 of FIGURE 3, or the corresponding parts of any of the other figures, may be integral with the rest of tire 9 as in FIGURES 3 and 4, or may be in a separate piece or pieces. If separate, it may be cemented, vulcanized or other-wise attached to the tire 9 or it may be located in the tire 9 without use of any adhesive. Similarly it may be sold separately from the tire and inserted into the tire at the service station. When sold separately it is preferably in a single piece that may easily be inserted into the tire. It may be used without it being cemented in place or it may be cemented if desired.

When the special support is sold separately from the tire it is, of course, desirable that it fit as many sizes of tires as possible and to this end provision may be made to change the size of the insert at will. In one form, the insert may be small enough to fit the smaller of a group of tire sizes with provision to add material to the insert to fit larger size tires. Alternatively the insert may be of proper size to fit the largest tire of a group with provision to peel off parts of the insert to reduce its size.

To carry out the purposes of the immediately foregoing paragraph, reference is made to FIGURE 5 where a side view of the insert 10, 11, and 12 of FIGURE 1 is shown with provision for increasing or decreasing the size to fit different tires. Here, the insert 10 of FIGURE 1 appears as a ring 10 in its side view, and it has supplemental rings 51 and 52 that may extend the same inwardly or outwardly as desired. The device of FIGURE 5 may come in two forms, first, it may be sold with the insert 10 with supplemental rings 51 and 52 attached to the insert 10 in some removable form. It is then ready for use with a large tire; and when it is to be used with smaller tires, one or both of rings 51 and 52 are removed as necessary. Secondly, the insert 10 may be sold without supplemental inserts 51 and 52 attached, in which event it is ready for use with small tires. When it is to be used with larger tires, one or both of inserts 51 and 52 may be added and cemented in place as necessary.

In connection with any of the forms of the invention the periphery of the ring-shaped support may be covered with an air-imperivous elastic membrane or sealing skin element. For example, FIGURE 6 shows the insert 20-23 of FIGURE 2 but with the air-impervious membrane 60 completely covering the periphery of the insert 20-23. This membrane may be cemented to the inner side wall of the tire, but not necessarily so; and in either event it provides improved protection against punctures as by nails. Thus if the insert of FIGURE 6 were inserted into the tire of FIGURE 2 and a nail were to pass through the tire 9, it will not also pass through membrane 60, since the latter will merely be pushed upward by the nail without penetration. The remainder of membrane 60 will be held against the inner side wall of the tire in an air-proof manner, especially if cemented to the tire near the edges of the membrane 60. The material of which membrane 60 is made, may be selected to enhance said puncture-proof property. As another example, elements 20, 21, 22 may be similar to elements 31, 32, 33 of FIGURE 3 and in such case the membrane or skin may be molded integrally with said element.

The inserts of all of the figures of the drawing, when formed separately from the rest of the tire, may be of any suitable semi-soft molded material such as natural or artificial rubber or any other elastic material. The resilience and movement of the insert may be correctly predetermined by selecting the desired size and shape of the cavities or perforations therein as well as the size of the ribs or webs thereof. Moreover, the size and weight of the insert can be selected so that it has minimum influence on the smooth riding qualities of the tire, alternatively the size and weight of the insert may be selected to carry maximum load, or further, there may be any desired compromise of these two extremes. In any case, one result is a strengthening of the overall tire.

In all forms of the invention the inserts or supplemental supports (10, 11, 12 of FIG. 1, etc.) assume the positions, relative to the rim, shown in the drawings when the tire is mounted and full of air at normal operating pressure. During the normal operation the insert or supplemental support does not contact the rim 7. However, if there is a blowout, or if the tubeless tire loses its air, the insert or supplemental support will support the wheel and its inner surface (for example, part 13 of FIGURE 1, etc.) will be pressed against the inner face 8 of the rim. The car will then run on the insert or supplemental support until the driver reaches a safe place where he can change tires. If the insert or supplemental support is designed to be strong enough, it will give complete protection against blowouts. If it is designed to be relatively weak, it may be sufficient to enable the driver to drive a short distance at a slow speed without injuring his tire. The support 31, 32, 33 of FIGURES 3 and 43 and 44 of FIGURE 4 molded integrally with the tire even more than the inserts of the other figures. As a result the tread portions of FIGURES 3 and 4 may be thinner than usual to compensate at least in part the weight added by such support.

With that form of my invention where the insert is sold separately from the tire, the insert will last indefinitely and may be transferred from one set of tires to the next each time that the car owner buys a new set of tires.

FIGURE 7 illustrates a pneumatic tubeless tire 9 which has a molded insert 70 of elastic material comprising a plurality of legs or webs 71 connected by cross webs 72. The insert rests upon that portion of the inner side wall 73 of the tire which is adjacent the edge of the rim 74. In event the tire should lose its air, the insert 70 will ride on the portion 73 which in turn is carried by the rim 74 and the insert 70 will provide the necessary support for the tire while the latter operates for a short distance.

In FIGURE 8, the pneumatic tubeless tire 9 fits on to the rim 7 which has an inner face 8 which receives the insert 80 comprising radial legs 81, 82 etc., connected by cover 83 and cross webs 84. The middle support 82 may have a few slots or indents 85 along its inner surface 86 to permit easier insertion of the middle rib 82 onto the rim 7 during installation. Alternatively, instead of the small slots or indents 85, a plurality of deeper slots 87 may be cut from the member 82 (including the cross webs 84) from time to time around the inner wall of insert 80.

Other constructions than those illustrated by way of example and other materials can be used within the scope of this invention. For instance, a curved perforate ring in the shape of member 75 of FIGURE 7 can be made of hard, thin resilient material and be located in place of member 75, to provide a spring action in case of a blowout or flat tire.

I claim to have invented:

1. An insert for a pneumatic tubeless tire adapted to fit the rim of a wheel comprising an elastic ring having its widest part at its periphery and tapering in width as its diameter decreases, the periphery of said insert having the same diameter as the inner wall of the tubeless tire, said ring having an inner wall of such a diameter as to bear against the felloe of the rim of the wheel on which the tubeless tire is placed only when the tire is at least partially deflated.

2. In a wheel and tubeless tire arrangement, a wheel having a rim the periphery of which is concave, a tubeless pneumatic tire fitting said rim, said tire comprising elastic material having an inner wall, and a ring of elastic material having a periphery in engagement with the inner wall of the tire and having a convex inner surface adapted to fit the concave surface of said rim so that if the tire loses its air the ring will support the wheel, said elastic ring having sufficient rigidity to support the normal load of said tire without collapsing.

3. In a wheel and tubeless tire arrangement, a wheel having a rim, a tubeless pneumatic tire fitting said rim, said tire comprising elastic material having an inner wall, and a ring of elastic material extending from the inner wall of the tubeless tire to a position adjacent to but substantially spaced from said rim so that if the tire loses its air said ring will engage the rim and support the wheel, said ring defining a plurality of circumferentially spaced chambers, each chamber extending radially inwardly from substantially the outer periphery of said ring to substantially the inner periphery of said ring, said elastic ring having sufficient rigidity to support the normal load of said tire without collapsing.

4. In a wheel and tire arrangement, a wheel having a rim with a tubeless tire mounted thereon, a plurality of ring shaped elastic support means extending radially inward from that portion of the inner wall of the tire on the opposite side of the tread, and elastic cross braces connecting said plurality of ring shaped elastic support means, said ring shaped elastic support means normally extending close to but in spaced relation to said rim so that it will ride on the rim if the tire loses its air.

5. In a wheel and tubeless tire arrangement, a wheel having a rim, a tubeless pneumatic tire fitting said rim, said tire comprising elastic material having an inner wall, and a ring of elastic material extending from the inner wall of the tubeless tire to a position adjacent to but substantially spaced from said rim so that if the tire loses its air, said ring will engage the rim and support the wheel, said ring defining a plurality of circumferentially spaced chambers extending radially inwardly from substantially the outer periphery of said rim, said elastic ring tapering to a narrower width as its diameter decreases.

References Cited

UNITED STATES PATENTS

| | | | |
|---|---|---|---|
| 1,324,944 | 12/1919 | Watkins | 152—158 X |
| 2,166,927 | 7/1939 | Brunswick | 152—158 X |
| 2,246,117 | 6/1941 | Wallace | 152—158 |
| 2,308,959 | 1/1943 | Brink | 152—158 X |
| 2,713,373 | 7/1955 | Daugherty | 152—158 X |

ARTHUR L. LA POINT, *Primary Examiner.*

C. W. HAEFELE, Y. P. SCHAEVITZ,
*Assistant Examiners.*